Feb. 9, 1971 J. P. JORGENSON Re. 27,050

BOAT MOORING DEVICES

Original Filed Jan. 13, 1961

INVENTOR.

John P. Jorgenson

BY Paul B. Wiencek

Attorney

United States Patent Office

Re. 27,050
Reissued Feb. 9, 1971

27,050
BOAT MOORING DEVICES

John P. Jorgenson, Fort Lauderdale, Fla., assignor, by direct and mesne assignments, to Tomlinson Industries, Inc., Cleveland, Ohio, a corporation of Ohio Original No. 3,122,120, dated Feb. 25, 1964, Ser. No. 82,642, Jan. 13, 1961. Application for reissue Feb. 2, 1970, Ser. No. 13,145
Int. Cl. B63b *21/00*
U.S. Cl. 114—230 3 Claims

Matter enclosed in heavy brackets [ ] appears in the original patent but forms no part of this reissue specification; matter printed in italics indicates the additions made by reissue.

*ABSTRACT OF THE DISCLOSURE*

*A force absorbing system adapted to be used with a moored vessel includes a base affixed to the dock, a pair of yielding elements extending from the base and a pair of vertically disposed bumper sections attached to respective yielding elements. The bumper sections are suspended in the water with clearance from the bottom and receive support from the dock from above the water line.*

Figure 1:
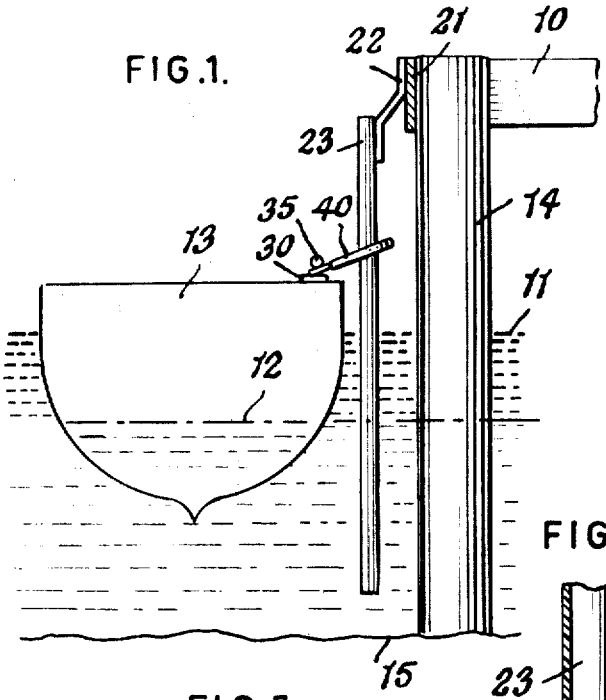

This invention relates to boat mooring devices, and is, in some respects, a simplification of and improvement upon the "Boat Mooring Assembly" shown in my Patent No. 2,845,892, dated Aug. 5, 1958.

One of the problems confronting owners in mooring small boats, particularly on estuaries in which there is heavy traffic, is the protection of the vessels from being pounded against a dock or seawall when receiving the force of a wave front, as from the wake of a passing vessel proceeding at sufficient speed to create a noticeable wake. A force of this type sufficient to move a vessel may be very small, but when the moored vessel is subjected to successive wave fronts, unless means are provided to absorb the forces in action, the vessel will be forced against the dock or seawall, with possible damage to its onshore topsides and hull.

Except for the method shown in my Patent No. 2,845,-892, the present practice in protecting vessels from such damage is to space the vessel from the dock or seawall, as by a set of dolphins, in which event reliance must be put upon the soundness of the mooring lines, or to interpose fenders between the vessel and the dock. Fenders have the disadvantage that they wear rapidly and must be replaced.

One of the objects of this invention is to provide a permanent, inexpensive, efficacious means interposed between the moored vessel and the dock, which will absorb the force developed in the moored vessel by random wave fronts or other agencies, so that the force will be fully dampened before the moored vessel makes a contact with the dock or seawall, without resort to the system of locks shown in Patent No. 2,845,892.

Another object of the invention is to provide a mooring means which, at the same time, may be utilized for the absorption of the force described, thus dispensing with the installation of bollards, dolphins, or the like, and the use of fenders.

Another object of the invention is the provision of a mooring means, adapted either for on- or off-shore installation, of low cost and simple construction, which will, at the same time, serve as an efficacious means for limiting a sidewise movement by the vessel when it is subjected to random forces such as those described.

In the instance of small pleasure craft, particularly, the practice has been to moor them as adequately as the existing art permits and, of necessity, leave them unattended and subject to whatever random forces they may experience. Thus a further object of my invention is to provide efficacious moring means for an unattended moored vessel, which will protect such a vessel from any normal random forces that it might experience.

A further desideratum in the mooring of small vessels is the provision of means to accommodate the vertical movement of the vessel, occasioned by the rise and fall of the tide, where the tide is a factor, or by other changes in the water level. A further object of my invention, then, is to provide simple, inexpensive, manually operated means which will permit vertical movement of the vessel, while retaining permanent engagement with my mooring means.

A still further object of my invention is the provision of an improved type of mooring harness or cable and cleat which permits rapid manual encirclement of the cable around one of my mooring members and the engagement of the cable latch with the cleat member by a simple sequence of movements, disengagement being effected only by a reversal of the movement sequence, which cannot occur unless the disengagement is manually directed. Thus the vessel will remain securely moored, may rise and fall with changes in the water level, and will be protected from the dock by the force absorbing characteristics of the mooring members. Nevertheless, the vessel can be rapidly disconnected when ever the occasion requires it.

These and other objects of my invention are further more particularly pointed out in the drawings, the following specification, and are set forth in the claims and all equivalents thereof.

Figure 2:
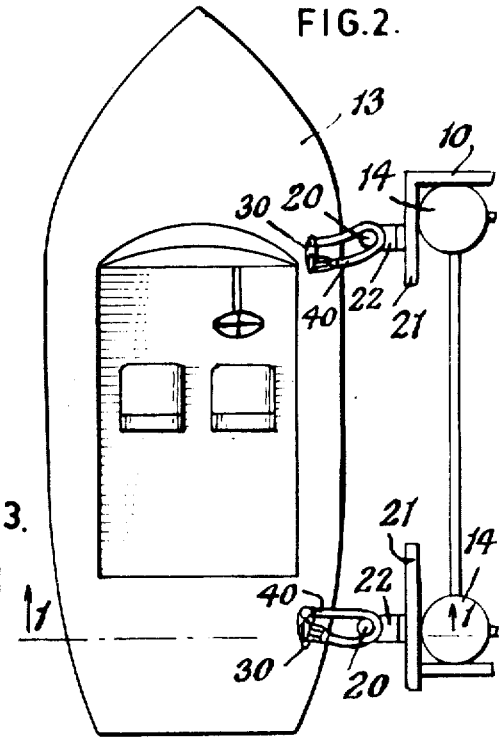
Figure 3:
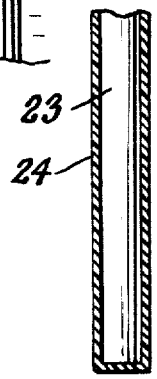
Figure 5:
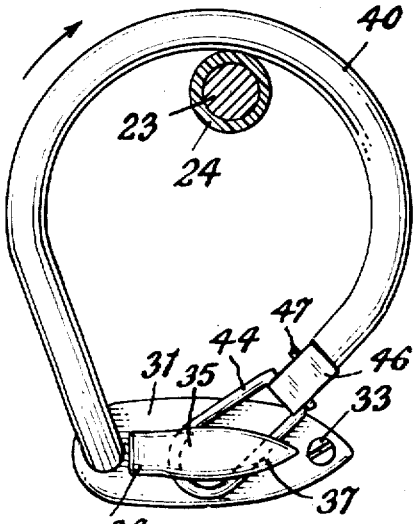
Figure 7:
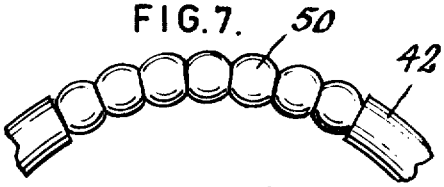
Figure 4:
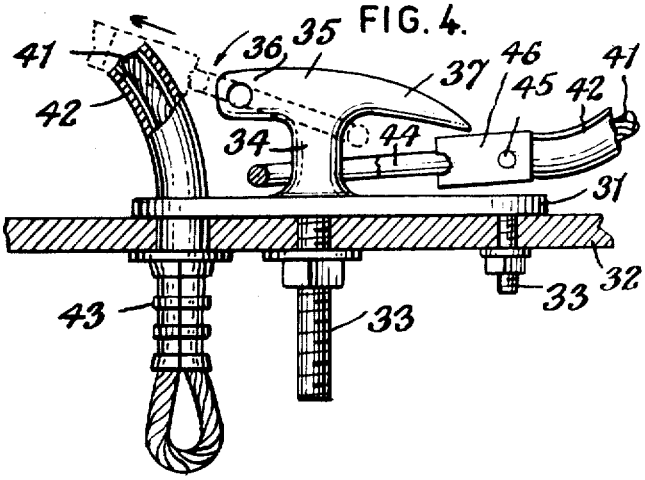
Figure 6:
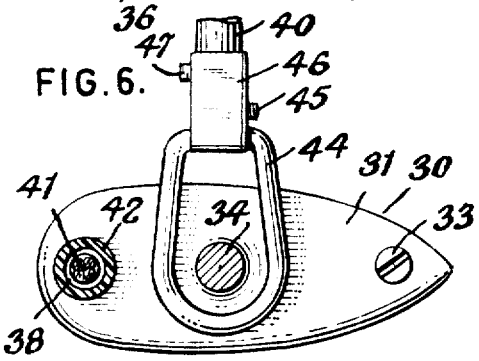

In the drawings FIG. 1 is a sectional view along the line 1—1 of FIG. 2, of a moored boat utilizing my invention. FIG. 2 is a plan view of a moored vessel. FIG. 3 is an enlarged sectional view, partly broken away, of the lower portion of one of my mooring members. FIG. 4 is a side elevational view of the form of cleat used in my invention, being shown attached to the deck of the vessel, shown in section, the mooring ring being shown, partly in section, in an engaged position, and in dotted lines in a preliminary placement position. FIG. 5 is a plan view of the cleat with the mooring ring or yoke being shown in a final engaged position, and the cable, encircling one of my mooring members. FIG. 6 is an enlarged plan view of the mooring ring or yoke and the base of the cleat, the neck of the cleat and part of the cable being shown in section. FIG. 7 shows a portion of the bight of the cable on which I dispose beads to reduce cable wear as the cable rises and falls while in contact with a mooring member, the details later to be described.

Referring now particularly to FIG. 1, 10 indicates a dock, pier or seawall. Where the location is in a tital estuary, a high water mark is indicated at 11 and the low watermark at 12, high water mark being shown as the line of flotation for the moored vessel, indicated generally at 13. Disposed on the dock are a pair of spaced piles 14, the bottom being indicated at 15.

My mooring means include a pair of mooring members or bumpers, indicated generally by the numeral 20. They are shown as being mounted to the piles 14 by a mounting base 21 suitably attached to the piles by any attachment means. Protruding from the base 21 is a spring section 22, from which the bumper section 23 extends downwardly to a point spaced above the bottom 15 so that the bumper section may move freely in any direction, the spacing of the bumper section from the base 21 and the piling 14 being such that lateral movement of the bumper section in the direction of the dock or seawall is possible.

Encasing the mooring member or the bumper section 23 is a tube 24 of plastic material, such as one of the vinyls, see FIG. 3, the function of which is to protect the side of the boat from contact with the metal portion of bumper section 23.

In the practice of my invention, I have found that, while a strong force bringing the vessel against the bumper section may cause the bumper section to move laterally to such a degree that its lower end may be brought in contact with the dock or seawall, nevertheless, where the parameters of the bumper are in normal relation to the tonnage of the vessel being moored, forces normally experienced, such as the wakes of passing vessels, will be fully absorbed by the bumper section 23, through its movement in the water for even a relatively short distance, and contact between the lower end of the bumper with the dock will be exceptional.

It is of course obvious that the parameters of the bumper will vary with the tonnage of the vessel to be moored. By way of example, I have found that for a vessel of two tons having an overall length of 21 feet, a bumper of ¾ inch square rod spaced four inches from the dock affixed to a leaf spring 2 by 5/16 inch having a working length of approximately six inches will be adequate to protect the vessel against any forces that might be normally expected.

Appropriate spacing of the bumpers relative to the over-all length of the vessel is shown in plan in FIG. 2.

While the vessel 13 may be moored from conventional cleats to bollards, neither of these items being shown in FIG. 2, in which circumstance the mooring members or bumpers perform the function of force absorbers, and are so designated in the claims, I prefer to moor the vessel to the mooring members and to use a special type of cleat, indicated generally at 30, and a mooring cable, indicated generally at 40, FIGS. 1 and 2, although it is likewise obvious that the vessel may be attached to the mooring members by other means.

The cleat 30 is shown in detail in FIG. 4. It comprises a base 31 affixed to the deck 32 of the vessel, as by bolts 33, 33, and includes a neck 34 supporting an off-set portion, indicated generally at 35, having a stub portion 36 and a tapered portion 37. It is preferable that the cleat be mounted with the stub portion facing forward of the vessel and the tapered portion facing aft.

The cleat 30 is preferably provided with a base opening 38, see FIG. 6, on the forward side of the cleat, which serves as a positioning means for a mooring cable or latching means, indicated generally at 40. The opening 38 has a diameter such that the size of cable will move freely therethrough from a retracted position to the engaging position shown in FIGS. 4 and 5.

Referring now to the mooring cable 40, it comprises a stranded metal cable 41, preferably of stainless steel, serving as a spring member in the functioning of the device, with a jacket 42 of plastic, such as one of the vinyls. The device will function between if the jacket is tubed, rather than extruded on the stranded cable. At the lower end of the cable 40, below the deck, is a stop 43 which may be a cable clamp, as shown, or any other suitable means firmly fixed to the cable 40 and larger than the opening 38. At the other end of the cable and above the deck is a yoke or mooring ring 44, suitably attached to the cable, as by set screws 45, 47 in the neck 46 of the yoke, as shown in FIG. 6. The yoke 44 has a long axis in the longitudinal direction of the cable 40, and a short axis at right angles thereto, as shown in plan in connected position to the clamp 30 in FIG. 6. The dimension of the long axis of the yoke 44 is such that when the yoke is passed over the tapered portion 37 of the cleat 30 and brought into contact with the aft side of the neck 34, as shown in dashed lines in FIG. 4, and then moved downwardly toward the deck, it will just clear the stub portion 36 of the cleat 30.

The short axis of the yoke must, of course, be large enough to clear the largest transverse dimension of the cleat 30 as it is drawn over the tapered portion 37.

Engagement of the yoke with the cleat to moor a boat is effected in the following manner: when the cleat is within manipulative distance of a bumper section 23, shown in section in FIG. 5, the mooring cable is drawn upward through the opening 38, passed clockwise around the bumper section, as shown by the arrow in FIG. 5, as observed from above, the yoke 44 is then drawn over the tapered portion of the cleat 37, as shown by the arrow in FIG. 4, and then moved downwardly beyond the stub portion 36, when it may be released, and the spring character of the cable 41 will then rotate the yoke 44 clockwise more than ninety degrees to the position shown in FIG. 5. Release of the cable is effected by reversing the sequence of the operation described.

Having fully described my invention, I claim:

1. A force absorbing system, adapted to be used with a moored vessel, including at least two immersed spaced force absorbing members, interposed between the moored vessel and a dock or the like, and spaced therefrom, said force absorbing members each comprising a base, affixed to the dock, a vertically disposed element attached to the base and extending downwardly to a point substantially below low water mark, but having clearance from the bottom, and a yielding element between said vertically disposed element and said base, [.]

*said vertically disposed element being supported only above the water line with the portion below the water line suspended in the water without further support from the dock.*

2. A force absorbing system according to claim 1 in which the yielding element is a leaf spring.

*3. A force absorbing system, adapted to be used with a moored vessel, including*

*at least two immersed spaced force absorbing members, interposed between the moored vessel and a dock or the like, and spaced therefrom,*

*said force absorbing members each comprising:*

*(a) a base, affixed to the dock,*

*(b) a yielding element extending from said base, and*

*(c) a vertically disposed element attached to said yielding element and extending downwardly to a point substantially below low water mark, but having clearance from the bottom, said vertically disposed element being supported only above the water line with the portion below the water line suspended in the water without further support from the dock.*

References Cited

The following references, cited by the Examiner, are of record in the patented file of this patent of the original patent.

UNITED STATES PATENTS

| | | | |
|---|---|---|---|
| 2,945,892 | 8/1958 | Jorgenson | 114—230 |
| 2,956,531 | 10/1960 | Banker | 114—230 |
| 1,811,400 | 6/1931 | McClellan. | |
| 2,550,913 | 5/1951 | Coffing. | |
| 2,754,792 | 7/1956 | Baird. | |
| 2,808,016 | 10/1957 | Jarnot. | |
| 2,836,141 | 5/1958 | Brydon. | |
| 2,871,813 | 2/1959 | Klawitter. | |
| 2,956,531 | 10/1960 | Banker. | |

FOREIGN PATENTS

| | | |
|---|---|---|
| 1,061,408 | 11/1963 | France. |

TRYGVE M. BLIX, Primary Examiner